Dec. 21, 1926. 1,611,341
P. DÉRIAZ
HYDRAULIC TURBINE
Filed April 19, 1923 9 Sheets-Sheet 1

INVENTOR
Paul Dériaz
by his attorneys
Byrnes, Stebbins & Parmelee.

Dec. 21, 1926.

P. DÉRIAZ 1,611,341

HYDRAULIC TURBINE

Filed April 19, 1923    9 Sheets-Sheet 2

INVENTOR.
Paul Dériaz
by his attorneys
Byrnes, Stebbins & Parmelee.

Dec. 21, 1926.

P. DÉRIAZ

HYDRAULIC TURBINE

Filed April 19, 1923   9 Sheets-Sheet 3

INVENTOR.
Paul Dériaz
by his attorneys
Byrnes, Stebbins & Parmelee.

INVENTOR

Dec. 21, 1926.  1,611,341
P. DÉRIAZ
HYDRAULIC TURBINE
Filed April 19, 1923   9 Sheets-Sheet 6

Fig. 12.

INVENTOR
Paul Dériaz
by his attorney
Byrnes, Stebbins & Parmelee.

Dec. 21, 1926.  
P. DÉRIAZ  
1,611,341  
HYDRAULIC TURBINE  
Filed April 19, 1923  9 Sheets-Sheet 7

INVENTOR.

Dec. 21, 1926. 1,611,341
P. DÉRIAZ
HYDRAULIC TURBINE
Filed April 19, 1923   9 Sheets-Sheet 8

INVENTOR.
Paul Dériaz
by his attorneys
Byrnes, Stebbins & Parmelee.

Dec. 21, 1926. 1,611,341
P. DÉRIAZ
HYDRAULIC TURBINE
Filed April 19, 1923    9 Sheets-Sheet 9

INVENTOR
Paul Dériaz

Patented Dec. 21, 1926.

1,611,341

UNITED STATES PATENT OFFICE.

PAUL DÉRIAZ, OF LONDON, ENGLAND, ASSIGNOR TO THE ENGLISH ELECTRIC COMPANY, LIMITED, OF LONDON, ENGLAND, A BRITISH COMPANY.

HYDRAULIC TURBINE.

Application filed April 19, 1923, Serial No. 633,141, and in Great Britain April 27, 1922.

This invention relates to an improved form of hydraulic reaction turbine which is primarily intended for high specific speed working, but also embodies features of more general application.

In accordance with the invention the runner, which is of a form suitable for centrifugal flow (i. e. for the passage of the water from the inside to the outside of the moving ring of blades), is combined with an introductory guide arrangement by which the water has imparted to it, prior to its entry into the space enclosed by the ring of runner blades, a vortex motion which results in the production of a form of flow into and through the runner which is conducive to high efficiency and to a high specific speed of working. The attainment of these conditions is also further assisted by the means employed for receiving the water discharged from the runner and taking it into the tail race and by the form and disposition of the runner blades and by an arrangement which permits of the angles of these blades being varied during running to adapt the turbine to efficient working under varying load or head without moving the guide blades, so that the form of the flow through these blades to the runner is not altered from the type above indicated by changes of these conditions.

The invention is largely based on the discovery that it is possible to obtain in such turbines an approximation to straight line flow from the inlet channel to the runner blades. Accordingly when the direction in which the water encounters the runner blades has been determined the walls of the entrance chamber and the guide blades therein are so formed and disposed in relation to the runner that threads of water on leaving these blades have approximately the same directions as those in which they move when about to encounter the runner blades. The required direction of flow within the runner is thus given to the water by the guiding arrangement and persists owing to the establishment of a stable vortex. The lines of flow are actually formed of parts of spirals but these are so chosen that they combine to give a close approach to a straight line. This form of flow results in the production of a short path for the water and a reduction of friction and eddy losses.

The invention will be described further by the aid of the accompanying drawings in which:—

Figures 1 and 1ª are axial sections of the runner and inlet passages of a turbine arranged for single inflow (i. e. for inflow from one axial direction only) and having its shaft vertical:

Figures 10, 11 and 19 show a further form of runner with adjustable blades.

Figures 16 (a) (b) and (c) are diagrams indicating the method of determining the form of the discharge chamber:

It will be recognized from the following description and from the drawings that, while the drawings, where they make a distinction, indicate turbines having vertical shafts, the majority of the features described are also applicable to turbines with horizontal shafts.

The arrangement adopted in the case illustrated in Figures 1 and 1ª is one in which the inlet chamber 20 is disposed below the runner 21, with the advantage of reducing the unbalanced thrust on the turbine bearing.

Figures 1, 1A:
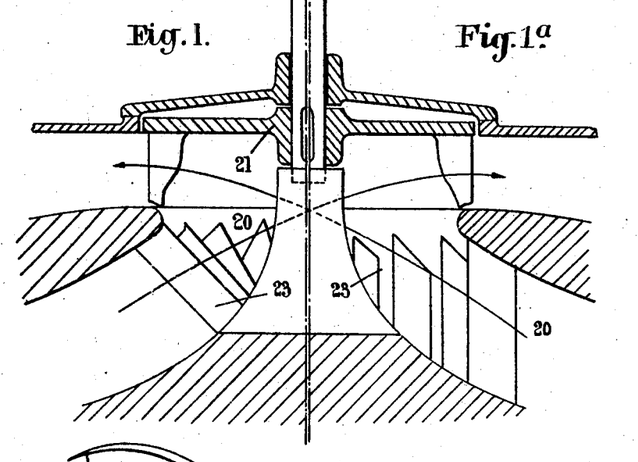
Figures 2, 3:
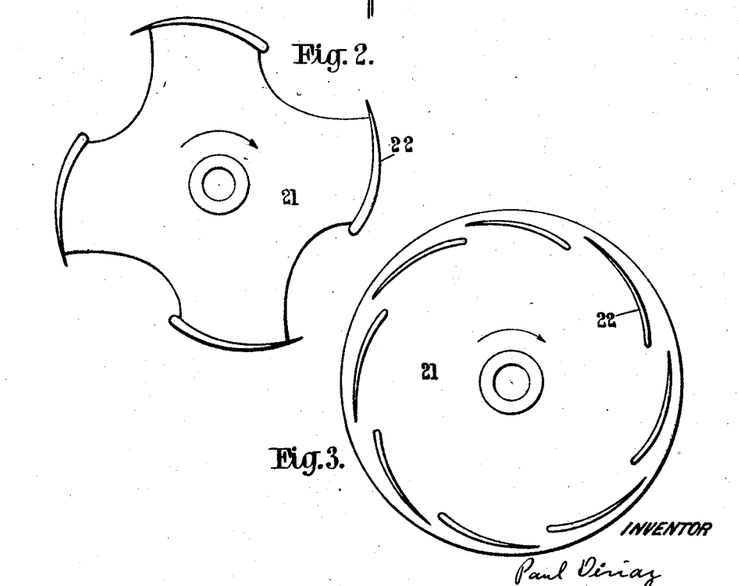
Figures 2 and 3 are end views of runners.

The runner is of the kind illustrated in Figures 2 and 3 consisting of a body of disc form having a ring of blades 22 standing out approximately at right angles to it. The disc may be cut away between the blades, for instance as shown in Figure 2, for the purpose of reducing surface friction and weight. The position of the guide blades 23 in the inlet chamber 20 may be varied within suitable limits. It is, however, desirable to keep them some distance away from the plane of entry to the space encircled by the runner blades since at this plane the area of the passage for the water is a minimum. Positions such as those shown in Figure 1 or Figure 1ª are convenient.

The inlet chamber 20 of Figure 1 at the part adjacent to the runner 21 is of annular form and, as shown, is inclined so that water flowing through it has a motion comprising both axial and radial components as the arrows indicate. These arrows also show that the components are so chosen that very slight change of direction, as seen when projected rectilinearly on to a plane of axial section, (i. e. a plane containing the axis of the turbine) takes place between the outflow from the guide blades and the inflow to the runner blades.

Figure 4:
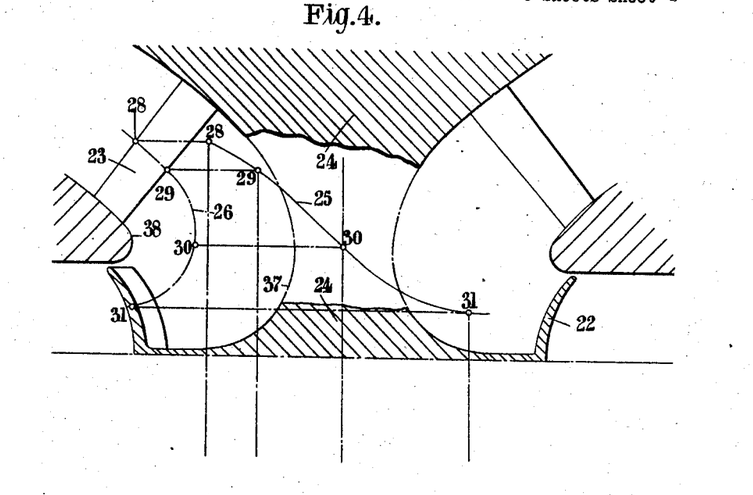
Figures 4 and 5 are diagrammatic views for the purpose of indicating the kind of path taken by the water in flowing into and through the runner.
Figure 5:
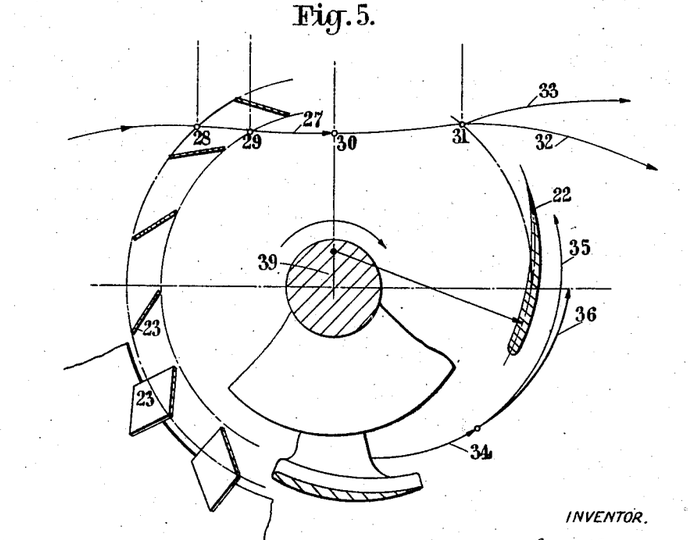

A consideration of Figures 4 and 5 will show that there is also very slight change of direction as seen when the flow lines are projected on to a transverse plane, i. e. a plane at right angles to a plane of axial section. In these figures the actual structure is only shown in a fragmentary manner, the object being to indicate only sufficient to enable the mean path of flow of water through the guide blades 23 and across the intervening space to the runner blades 22 to be recognized.

Straight lines and circular arcs required to indicate the projection of points are shown in broken lines arranged on or interconnecting the two figures.

The central hyperboloidal body 24 is formed by the inner walls of the guide passages and the hub of the runner, which will conform approximately to such a shape.

The mean path of the water through the guide blades 23 and thence to the blades 22 of the runner is shown by three different projections. The line 25 is the rectilinear projection of the path on an axial plane which is parallel with the general direction of the path across the runner. Line 26 is the projection of the path by circular arcs on to the same axial plane as that of the line 25 but in such a manner as to show only the combined axial and radial components of the path. Line 27 is the rectilinear projection of the path on to a transverse plane.

On these lines corresponding points are indicated by the same numerals. Points 28 and 29 indicate the positions of a particle of water as it enters and as it leaves the ring of guide blades in the region half way between a pair of blades and at about the middle of the height of the blade. Point 31 indicates the position reached by this particle when it is in the region in which it encounters the blades of the runner. Point 30 indicates an intermediate position in the path of movement of the particle between the guide blades and the runner blades. The direction of rotation of the runner is indicated by the arrow near the centre thereof. In the absence of the action of a blade 22 of the runner on the particle of water considered, the path would continue beyond the point 31 as indicated by the curved line 32. The effect of the encounter with the runner blade at its normal speed is to divert the particle from the path 32 to the path 33. The curved line 34 shows the path of the particle relative to the runner blade prior to encountering this blade and the line 35 indicates the path of the particle relative to the blade as the particle leaves the blade, the effect of the blade being to divert the particle from the relative path 36 (which is a continuation of the path 34) to the path 35.

The projected line 26 shows that the space between the hyperboloidal boundary lines 37 and 38 can be divided up by a series of lines such as 26 of similar form which indicate the shape in radial section of the surfaces on which particles of water travel from the guide blades to the runner blades.

The lines 25 and 27 make clear the approximation to straight line motion of the water previously referred to, and it will be recognized that the arrangements indicated establish a vortex in which the particles of water move within the region including the guide blades and the runner blades in approximately straight line paths on the surfaces which are approximations to hyperboloids of revolution.

The determination of the form of a turbine embodying the present invention can be based on the direction of mean lines of flow between the inlet and the runner blades such as 25 and 27 from which the form and position of such as 26 can be obtained. Prior to this step in the design it will of course be necessary to fix approximately the dimensions of the runner and the forms of the blades and the dimensions of the inlet chamber with the approximate location of the guide blades 23 therein. The dimensions of the runner and the inlet chamber will be settled in known manner from the data on which the design is based and the position of the inlet chamber and the guide blades in relation to the runner will be chosen so as to provide for comparatively small inclination to the horizontal of the line 25.

When the mean path 26 has been determined, it will give an indication of the shape of the lines 38 and 37 and as a first approximation these lines can be sketched in and then finally adjusted by tracing out the paths of particles of water from the guide blades to the runner blades along the surfaces produced by the rotation of the lines 37 and 38 about the axis of the turbine. It will be recognized that as previously indicated for the lines such as 25 and 27 to be approximately straight, the lines such as 26, 37 and 38 must be hyperbolic in general form.

In connection with turbines of the kind under consideration, it is possible to adopt a method of regulation common with other types of turbines which consists in angular adjustment of the guide blades for the purpose of dealing with changes in load or head. Such an adjustment has, however, the effect of altering the form of the vortex and causing a departure from the most advantageous paths of flow for the particles of water between the guide blades and the runner blades. Accordingly, by the present invention regulation is effected by varying the angular form or disposition of the blades of the runner, leaving the guide blades fixed so that the form of the vortex remains practically constant for all conditions, variation taking place in the velocity of movement of the particles of water but not in the form of the paths through which they travel.

As previously indicated the runner will in general consist of a disc or series of arms or some equivalent arrangement extending outward from a hub to which the turbine shaft is attached and carrying at its outer part a ring of blades standing approximately at right angles to the plane of the disc or set of arms and lying on one or both sides thereof according to whether it is a case of single or double inflow. For a runner having a high specific speed, each blade will at all points make an angle approaching towards 90° with a radial plane. The angle will of course change from point to point of the blade but in general appearance the lines of the blades will not depart very greatly from a circle described about a centre in the neighbourhood of the centre of the runner. For instance, in the arrangement indicated in Figure 5, the runner blade 22 has its centre line as part of a circle struck from the centre 39.

A form of blade which appears most suitable is one in which the section has the general appearance of a section which is commonly adopted for aeroplane wings. This is a form in which the blade has comparatively small curvature and at its inlet edge is rounded and thickened and then tapers continuously to a fine edge at the outlet end.

For high speed runners it appears preferable to employ a comparatively open arrangement of the blading. By this description of the arrangement, it is intended to indicate that the total circumferential length of the blades is only a fraction of the circle described by the outer parts of the blades around the axis. A suitable arrangement for these conditions is one in which four blades are used on a runner and each blade occupies about one eighth of the circle. Such an arrangement is indicated in Figure 2 of the drawings. Where conditions such as the head under which the turbine works make a closer spacing of the blades desirable, a form such as shown in Figure 3 may be employed. In this, each blade has its entrance edge in the neighbourhood of the radial plane in which lies the outflow edge of the preceding blade.

In many cases a form of blade (as shown for instance in axial section in Figures 4 and 10) in which the blade is carried outwards radially in passing from its root (that is the part at which it is carried on its disc or arm) to its tip, is advantageous. This follows from the fact that in general the velocity of the water particles in the region near the surface 38, Figure 4, is higher than in the region near the surface 37 so that a higher peripheral speed of the blade is required at the tip than at the root. This form of construction has also the advantage that it reduces the centrifugal force acting on each blade since only those parts have the maximum velocity where that velocity is required by the conditions of working.

It is to be understood that while certain forms and arrangements have been particularly described in the preceding paragraphs as suitable for high speed runners, other forms and arrangements can be adopted where runners of a lower specific speed are introduced.

Figure 6:
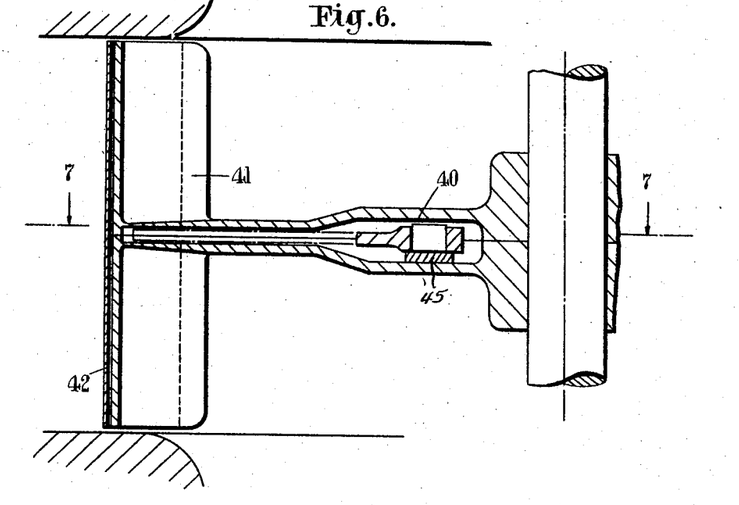
Figure 6 is an axial view, partly in section on line 6—6 of Figure 7, indicating a form of adjustable runner blade
Figure 7:
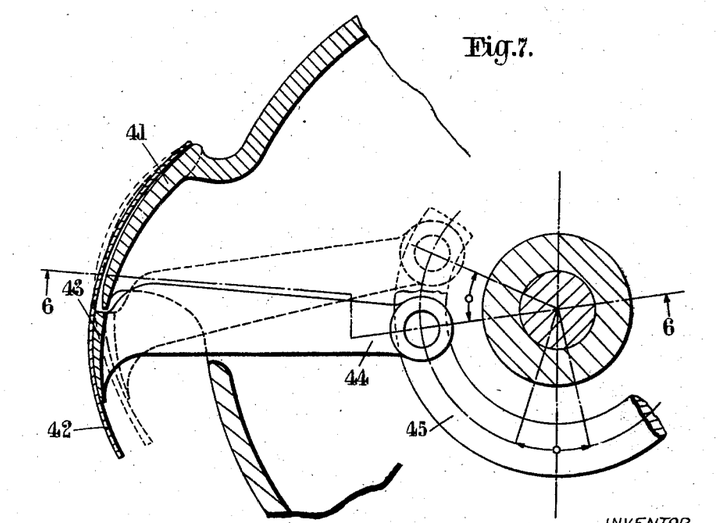
Figure 7 is a transverse section on the line 7—7 of Figure 6.

The form of runner which is used in accordance with the present invention is particularly well adapted for the use of means for varying the angular form or disposition of the blades during running, for instance, to accommodate variations of load or of head, and while both inlet and outlet angles may be adjusted, it appears that in many cases it may suffice to adjust the outlet angles only. Convenient arrangements for this latter form of adjustment involve the introduction of a hinge or flexible connection between the front and rear parts of the blades. A form of construction in which a flexible connection is used is shown in Figures 6 and 7. In this the disc 40 of the runner consists of a pair of similar castings forming together a hub and a plate and the front portions 41 of the blades. The rear portions of the blades are formed by a sheet of metal 42 which extends over the whole of the outside of the blade and is attached to the parts 41 near their front edges, for instance, by riveting or welding. To the rear part of the sheet 42 is attached the outer end 43 of an arm 44 which is adapted to be engaged at its rear end by a ring 45 which is movable around the shaft through the angle indicated and in so moving bends the sheet 42 so that it passes from the position shown in full lines to that shown in broken lines. By selecting the thickness of the sheet and keeping the points of attachment to the parts 43 and 41 as far apart as possible, the necessary amount of bending can be obtained well within the elastic range of the material.

Figure 8:
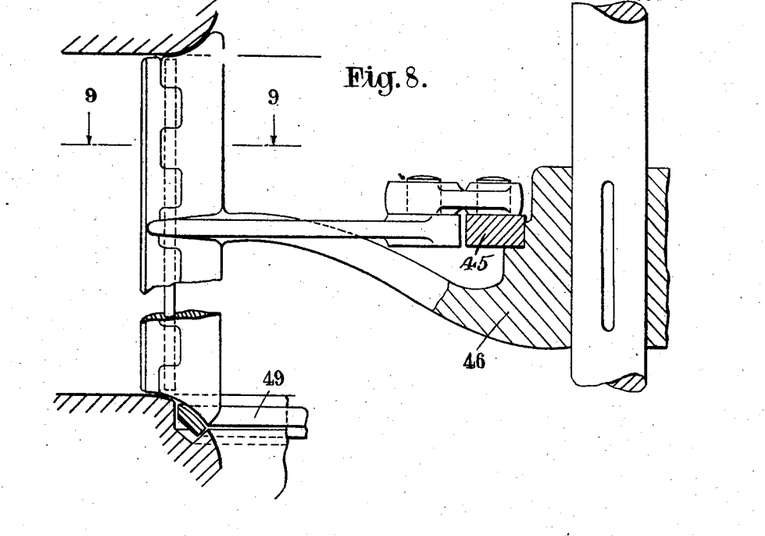
Figure 8 is an axial view, partly in section, of another form of adjustable runner blade
Figure 9:
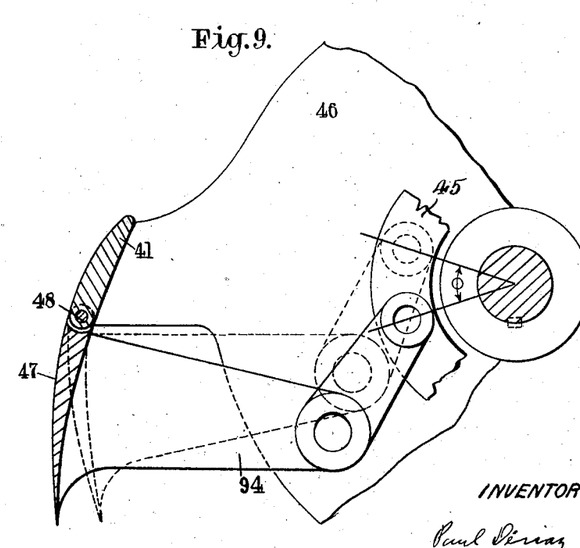
Figure 9 is a transverse view, part being in section on the line 9—9 of Figure 8.

Owing to the adoption of a form of blade in which as previously indicated there is considerable thickness of metal near the entrance edge, it is possible to form within the body of the blade a hinged joint such, for instance, as shown in Figures 8 and 9 in which the front parts 41 of the blades which are carried by a disc 46 are joined to the rear portions 47 by a hinge pin 48. These rear portions 47 have attached to them arms 94 which are engaged by a movable ring such as 45 in Figure 7 through the intermediary of links or pins and slots so that they may be turned from the position shown in full lines to that shown in broken lines. With this type of construction, it may be desirable to strengthen the runner by connecting together the front portions 41 of the blades by means of a ring 49 which has been indicated by way of example in the lower part of Figure 8, it being understood that such a ring might be provided at each end of the blades.

In general, it will be convenient to bring about the angular adjustment of the blades by giving a supplementary displacement to a sleeve which encircles and rotates with the turbine shaft which may conveniently be effected by the use of fluid under pressure. In the arrangement shown in Figures 10, 11, and 19, an adjustment of this kind is shown and from it will be recognized how a similar adjustment could be applied to arrangements of the kind already described in connection with Figures 6 to 9.

Figures 10, 19, 20:
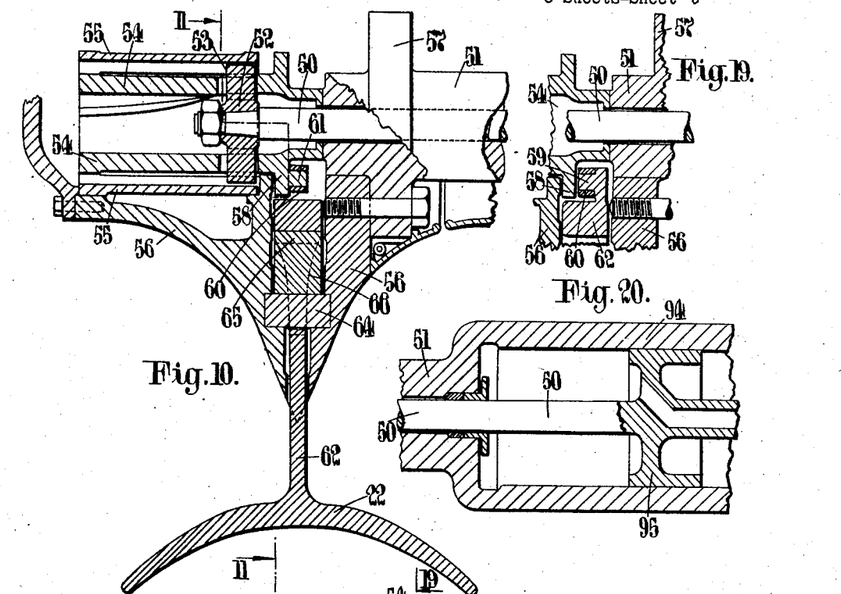
Figure 10 is an axial section on the line 10—10 of Figure 11.
Figure 19 is an axial section on the line 19—19 of Figure 11 (blade 22 considered to be in its dotted position) showing the innermost end of arm 62 and a part of the means for rocking the said arm.
Figure 20 is an axial section of a portion of the turbine shaft comprising a cylinder in which works a piston for actuating the turbine runner blades.
Figure 11:
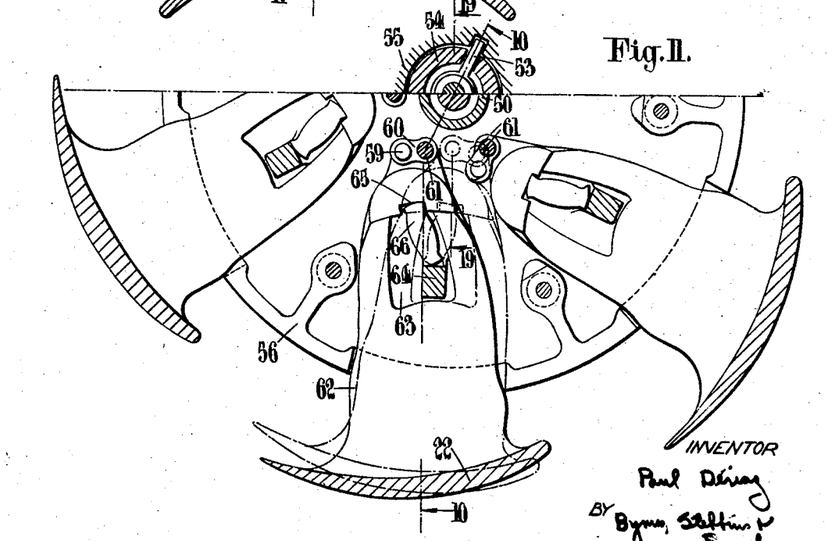
Figure 11 is a transverse section on the line 11—11 of Figure 10, the left hand portion of the body 56 being removed.

In the construction illustrated in Figures 10, 11 and 19 the angular adjustment is effected by the movement of the blade as a whole. The member by which the adjustment is brought about is the rod 50 which works within the hollow turbine shaft 51 and is moved axially by means of the piston 95 (Figure 20), to which it is attached, and by the admission of fluid under pressure into a cylinder 94 formed in the said shaft. This rod 50 carries at its end a cross piece 52, radial arms 53 of which pass through slots in a sleeve 54 and into grooves in an outer sleeve 55 fixed to the body 56 of the runner which is attached to the shaft 51 by the collar 57. The grooves in the sleeve 54 are helical and the recesses in the sleeve 55 are straight. Accordingly longitudinal movement of the rod 50 causes rotation of the sleeve 54 relative to the shaft and the body of the runner. This sleeve 54 has near one end a collar 58 from which project a series of pins 61 engaging in short links 60. Each of these links also engages a pin 59 projecting from the inner end of an arm 62 which carries a blade 22. In each arm is an aperture 63 through which passes a bearing member 64 which engages and is secured in the two halves of the body 56 of the runner. The inner end of the aperture 63 has formed in it a recess having a bearing surface 65. Between this surface and the adjacent surface of the bearing member 64 fits a member 66 which is part of a roller having surfaces adapted to roll on the two bearing surfaces. By longitudinal movement of the rod 50 the sleeve 54 is caused to turn relative to the body of the runner. As sleeve 54 turns it acts through links 60 on the arms 62 so that blades 22 are caused to turn through an angle. In this way blade 22 and arm 62 may be rocked from the position shown in full lines to that shown in broken lines for the middle arm and blade of Figure 11. By a correct choice of the proportions and disposition of the parts, it can be provided that the resultant force due to the pressure of the water on the blade and the centrifugal pull combined always acts in a line which passes either through or in the immediate neighbourhood of the points of contact between the roller member 66 and the bearing surfaces on which it works.

Figure 12:
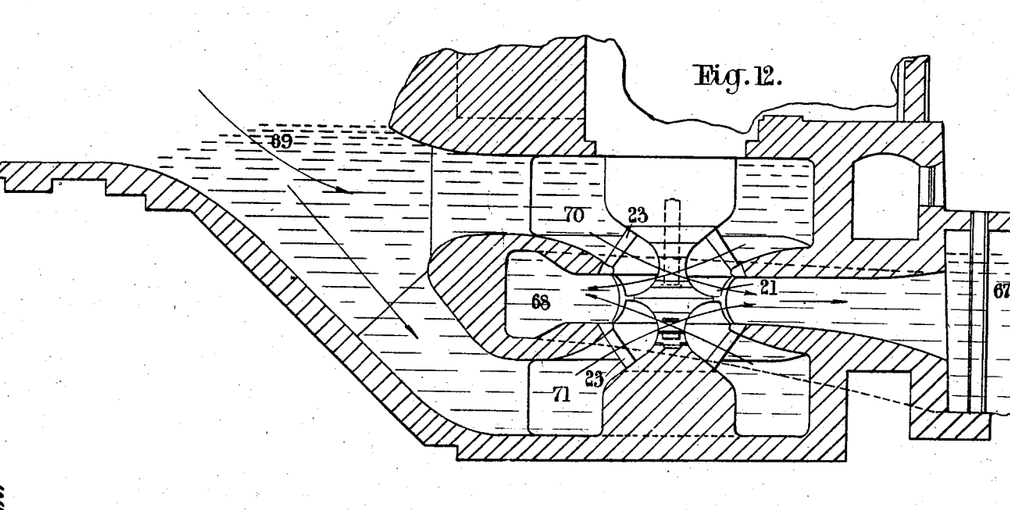
Figure 12 is an axial section showing the arrangement of a double inflow turbine on a vertical shaft.

Figure 12 of the drawings shows how advantageous features of construction previously mentioned may be combined to form a low head high speed installation. Here a vertical shaft arrangement is used and the runner 21 is arranged below the level of the water in the tail race 67 delivering directly into a discharge chamber 68 which is of a semi-oval form in horizontal section as hereafter described and discharges directly into the tail race. The water flows in through the main passage 69 to inlet chambers 70 and 71 arranged above and below the runner. From these the water passes through guide blades 23 to the runner in the manner already discussed in connection with Figures 4 and 5. The general path of water is shown by arrows. This arrangement provides in a comparatively small space and in a form that may readily be executed, a turbine of relatively large output. The short path and smooth flow of the water through the inlet chambers, the turbine and the discharge chamber indicates the possibility of relatively high efficiency.

As previously indicated, it is a feature of the invention to provide an appropriate form of chamber to receive this discharge and convert as much of the velocity of discharge as possible into pressure and at the same time secure a convenient form of construction for the mounting of the turbine.

The form of the chamber in a plane at right angles to the axis of the turbine is obtained by considering the form of the lines of flow, in two dimensions, which are produced when a source is superposed on a parallel stream. The carrying out of such a superposition in accordance with well known hydro-dynamic principles (see for instance the paper by D. W. Taylor in the "Transactions of the Institution of Naval Architects" (London) for 1894, Vol. 35, page 385, on "Ship-shaped stream forms", and in particular Figure 6 on Plate LXIX), results in the production of two systems due respectively to the two superposed elementary systems, the division between the two systems being a line of semi-oval form, the two sides of which are asymptotic to two lines parallel with the original direction of the parallel stream. This dividing line is taken as the approximate shape of the discharge chamber in the plane at right angles to the turbine axis. It is a characteristic of this curve that it applies without change to the case where the flow from the source is purely radial or where a circumferential component of greater or less relative value is present in the discharge. Accordingly, a chamber of such a shape is adapted for the conversion of velocity energy into pressure energy both where the velocity is radial and where it contains a circumferential component.

Figures 16A, 16B:
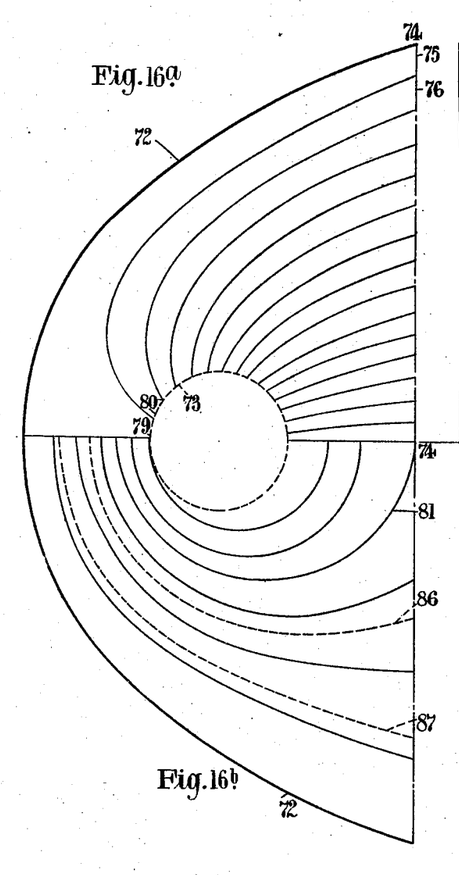

The curve formed by the dividing line between the two systems above referred to is indicated by the line 72 in Figures 16$^a$ and 16$^b$. In Figure 16$^a$ the other lines indicate the system of flow within the boundary 72 for the case where the flow from the source is purely radial. In Figure 16$^b$ are shown corresponding lines for the case of rotational flow within the same boundary. An examination of Figure 16$^b$ shows that in the two-dimensional case there is a greater quantity discharged from one side of the circle 73 than from the other. (The same quantity of water is assumed to flow in unit time between any pair of adjacent lines of that figure.) In order to make an approximate rectification of this, the dimensions of the discharge chamber parallel with the axis are varied from point to point, variation being calculated from the flow diagram Figure 16$^a$ so that where the flow is shown to be restricted the height of the chamber is proportionally increased. This results in the chamber, which of course must be of uniform height at the circle 73 where this represents the runner, progressively increasing in height from that point towards the boundary wall of the chamber. This progressive increase can be determined as follows:—

Figure 16C:
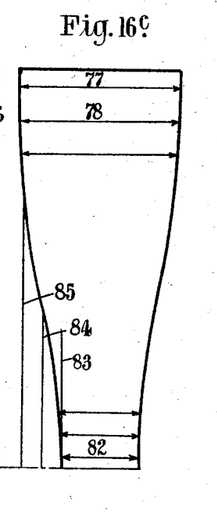

Figure 16$^c$ shows a section of the chamber on the line 74 of Figure 16$^a$. From the centre points 75, 76, etc., of the portions of this line cut off by adjacent lines of flow are projected lines 77, 78, etc., which serve as ordinates to measure the height of the chamber in Figure 16$^c$. These heights are then made proportionate to the lengths of the arcs 79, 80, etc., cut off on the circle 73 by the lines of flow, that is, the line 77 is made proportional to the arc 79 cut off by the two lines of flow, viz., the boundary line 72 and the next inner line between which is situated the point 75 from which the line 77 is projected. Similarly the line 78 is calculated in the same proportion from the length of the arc 80 and this process is continued for all of the fifteen divisions of the line 74. This results in the production of the form of section shown in Figure 16$^c$. The height of the chamber at other points may be obtained by recognizing that the circle 73 and the boundary line 72 and all of the curves shown in Figure 16$^b$ are lines of equal height. The height along the curve 81 is obviously that given by the ordinate 82 and if we take two equal increments of height indicated by the distances between lines 83 and 84 and 84 and 85 in Figure 16$^c$, we find by projection that the corresponding increased heights must exist along the broken lines 86 and 87, Figure 16$^b$.

Figure 13:
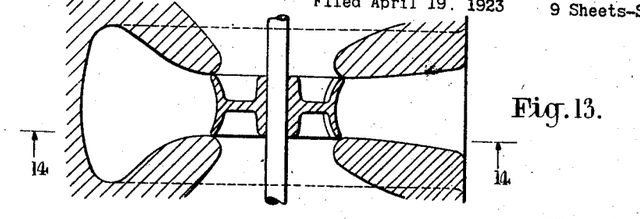
Figures 13, 14 and 15 show by axial section, transverse section and elevation respectively a discharge chamber.
Figure 14:
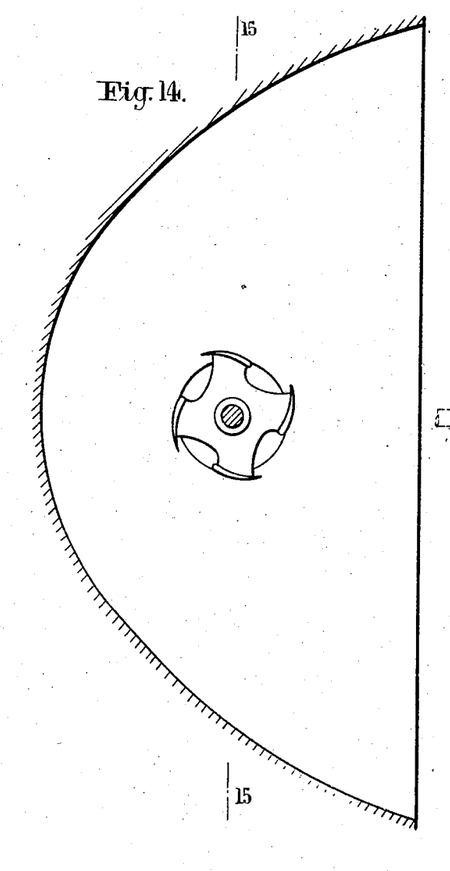
Figure 15:
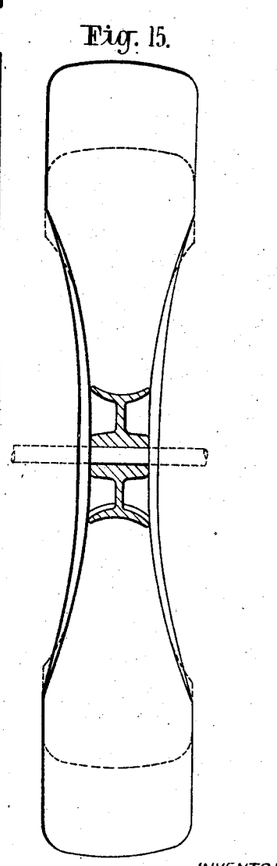
Figure 17:
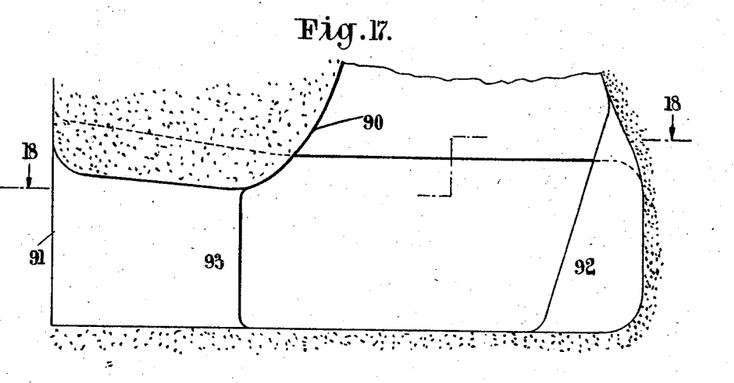
Figures 17 and 18 are axial and transverse sections on lines 17—17 and 18—18 respectively of a discharge chamber applied to the case of a turbine having axial outflow from the runner.
Figure 18:
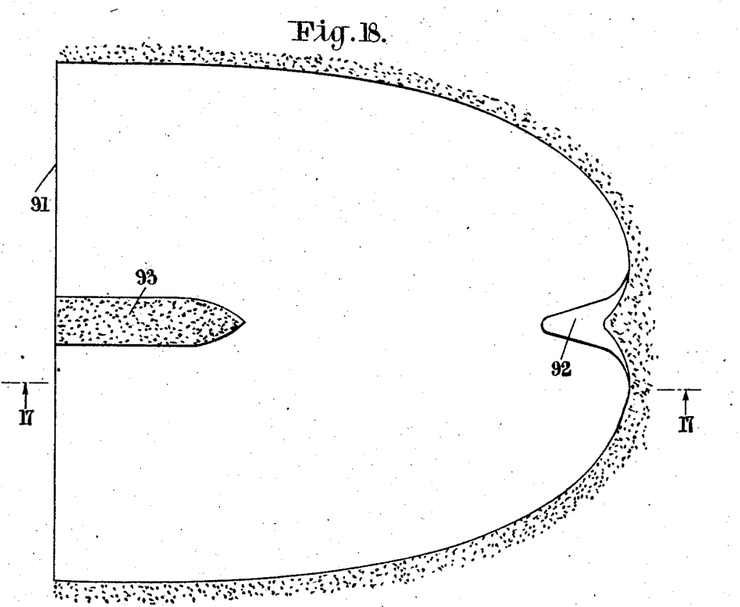

It will be seen that the method of procedure as indicated above results in the production of a discharge chamber of the form indicated in Figures 13, 14 and 15. The broken lines shown in Figure 15 indicate the shape of a section of the chamber on the line 15—15 of Figure 14. A general characteristic of this chamber is that it is semi-oval in plan, that its height increases progressively from the centre outwards and that the discharge aperture is of considerably greater height at the sides than near the centre.

Where the assumed conditions of flow into the chamber can be obtained with close approximation, it is desirable to keep to the design as obtained by the method indicated. Where, however, the initial conditions cannot be so closely approached, some slight departure from the precise form given by the method may be made without, however, destroying the general parabolic shape of the chamber as distinguished from semi-circular or other similar form. Figures 17 and 18 illustrate an example where some slight departure has been made for the case of a discharge chamber being used in conjunction with a turbine from which the water flows in an axial direction so that it has to be turned at right angles within or as it enters the discharge chamber. Here the water flows in by way of the draft tube 90 and is discharged by the aperture 91. The chamber is still in plan of semi-oval form except for the introduction of a buttress 92 in a position which will not materially influence the flow as Figure 16ª indicates. A support column 93 is introduced so as to divide the outlet 91 into two parts. This outlet will be seen to have materially greater height at the sides than at the centre. By the use of such a chamber the water which enters axially through the draft tube 90 and may have a whirling component is turned through a right angle and discharged at considerably reduced and approximately uniform velocity, the form of the chamber being such as to conduce to the transformation of a considerable part of the velocity into pressure.

What I claim as my invention and desire to secure by Letters Patent is:—

1. A hydraulic reaction turbine comprising a structure embodying an inlet channel and a runner chamber, a runner in said chamber carrying a ring of runner blades formed and disposed for centrifugal flow and surrounding a space within the runner chamber through which the water flows to them, and guiding means in the inlet channel disposed so as to lie axially outside any plane perpendicular to the turbine axis which intersects the runner blades, said guiding means directing the water in approximately straight line flow across the said space to the said blades.

2. A hydraulic reaction turbine comprising a structure embodying an inlet channel and a runner chamber, a runner in said chamber carrying a ring of blades formed and disposed for centrifugal flow and having inlet edges approximately parallel with the turbine axis, and guiding means in the inlet channel axially outside the space surrounded by the inlet edges of the ring of runner blades directing the water in approximately straight line flow across the said space to the said blades.

3. A hydraulic reaction turbine comprising a structure embodying an inlet channel and a chamber for the runner, a ring of guide blades in the inlet channel said channel being of annular form and inclined so as to direct the water towards the axis of the turbine and at a small angle to a plane at right angles to that axis, and a runner in said chamber carrying a ring of blades formed and disposed for centrifugal flow.

4. A hydraulic reaction turbine comprising a structure embodying an inlet channel and a chamber for the runner, a runner in said chamber having a hub, blade carrying means extending outward from said hub and a ring of blades formed and disposed for centrifugal flow, the said structure combining with the hub to form a boundary surface of hyperboloidal form for the space lying between the inlet channel and the runner blades.

5. A hydraulic reaction turbine comprising a structure embodying an inlet channel and a runner chamber, a runner in said chamber carrying a ring of blades formed and disposed for centrifugal flow, and a ring of guide blades in the inlet channel disposed so as to lie axially outside any plane perpendicular to the axis which intersects the ring of runner blades, said guide blades directing the water in approximately straight line flow to the runner blades.

6. A hydraulic reaction turbine comprising a structure embodying an inlet channel and a chamber for the runner, the said channel being of annular form and inclined so as to direct the water towards the axis of the turbine and at a small angle to a plane at right angles to that axis, a runner in said chamber carrying a ring of blades formed and disposed for centrifugal flow, and a ring of guide blades in the inlet channel directing the water in approximately straight line flow to the runner blades.

7. A hydraulic reaction turbine comprising a structure embodying an inlet channel and a chamber for the runner, a ring of guide blades in said inlet channel, and a runner in said chamber carrying a ring of blades formed and disposed for centrifugal flow, the said structure combining with the runner to form a boundary surface of hyperboloidal form for the space lying between the guide blades and the runner blades.

8. A hydraulic reaction turbine comprising a structure embodying an inlet channel and a runner chamber, a runner in said chamber carrying blades formed and disposed for centrifugal flow, guiding means in the inlet channel disposed so as to lie axially outside any plane perpendicular to the turbine axis which intersects the runner blades and directing the water in approximately straight line flow to the said blades and means for adjusting during running the angular position of the parts of the blades by a turning movement for each blade about an axis substantially parallel with the axis of the turbine.

9. A hydraulic reaction turbine comprising a structure embodying an inlet channel and a runner chamber, a runner in said chamber carrying a ring of blades formed and disposed for centrifugal flow and having inlet edges approximately parallel with the turbine axis, guiding means in the inlet channel outside the space surrounded by the ring of runner blades directing the water in approximately straight line flow to the said blades, and means for adjusting the angular disposition of the parts of the blades during running.

10. A hydraulic reaction turbine comprising a structure embodying an inlet channel and a runner chamber, a runner in said chamber carrying a ring of blades formed and disposed for centrifugal flow and having inlet edges approximately parallel with the turbine axis, a ring of fixed guide blades in the inlet channel outside the space surrounded by the ring of runner blades directing the water in approximately straight line flow to the runner blades, and means for adjusting the angular disposition of the parts of the runner blades during running by a turning movement about an axis substantially parallel with the inlet edge of each blade.

11. A hydraulic reaction turbine comprising a structure embodying an inlet channel and a runner chamber, a runner in said chamber carrying a ring of blades formed and disposed for centrifugal flow, guiding means in the inlet channel outside the space surrounded by the ring of runner blades directing the water to the said blades, means for varying the angular disposition of each of said blades, said means comprising an arm carrying the blade at its outer end, a roller member engaging said arm and the runner, and means for displacing the inner part of said arm so that the roller member moves therewith.

12. A hydraulic reaction turbine comprising a runner arranged for centrifugal flow and having a body and a set of blades angularly movable relative thereto, a set of arms each carrying a blade at its outer end and having an aperture near its inner end, a set of bearing members carried by the body of the runner, one being located in each of said apertures, a roller member also located in each of said apertures and engaging with its rolling surface the said bearing member and a face in the aperture, and means for imparting movement to the inner end of each arm thereby causing the roller member to turn and the blades to be angularly displaced.

13. A hydraulic reaction turbine comprising a structure embodying a runner chamber, an inlet channel and an outflow chamber surrounding the runner chamber and being of semi-oval form in section on a plane at right angles to the axis of the runner, a runner in the runner chamber carrying a ring of blades formed and disposed for centrifugal flow and working in the region at which the runner chamber joins the outflow chamber.

14. A hydraulic reaction turbine having a vertical shaft and comprising a structure embodying a runner chamber, an inlet channel above said runner chamber and a similar inlet channel below said runner chamber and an outflow chamber surrounding the runner chamber, a runner in the said runner chamber carrying a ring of runner blades formed and disposed for centrifugal flow and working in the region in which the runner chamber is joined to the outflow chamber, the outflow chamber being of semi-oval form in a horizontal section and leading directly into the tail race in an approximately horizontal direction.

15. A hydraulic reaction turbine having a chamber for receiving the discharge from the runner, this chamber being of semi-oval form in a plane at right angles to the axis of the runner, the form of the semi-oval being approximately that of the boundary curve between two systems of lines of flow produced by the superposition of a source upon a parallel stream, substantially as described.

16. A hydraulic reaction turbine having a chamber for receiving the discharge from the runner, this chamber being of semi-oval form in a plane at right angles to the axis of the runner, the form of the semi-oval being approximately that of the boundary curve between two systems of lines of flow produced by the superposition of a source upon a parallel stream, and having the dimensions at right angles to the said plane varied from point to point so as to obtain approximate uniformity in distribution of the discharge around the circle of entry from the runner to the chamber, substantially as described.

17. A hydraulic reaction turbine having a chamber for receiving the discharge from the runner, this chamber being of semi-oval form in a plane at right angles to the axis of the runner, the form of the semi-oval being approximately that of the boundary curve between two systems of lines of flow produced by the superposition of a source upon a parallel stream, the dimensions of the chamber parallel with the axis of the turbine increasing progressively from the uniform value at the circle of entry of the water to another approximately uniform value at the boundary of the chamber, the circle of entry being described about the position of the hypothetical source utilized in the determination of the shape of the boundary of the chamber.

18. A hydraulic reaction turbine having a chamber for receiving the discharge from the runner, this chamber being of semi-oval form in a plane at right angles to the axis of the runner, the form of the semi-oval being approximately that of the boundary curve between two systems of lines of flow produced by the superposition of a source upon a parallel stream, the value of the dimensions of the chamber parallel with the axis of the turbine varying from point to point and being determined from the two dimensional flow diagrams (Figures 16ª and 16ᵇ) representing respectively the case of a source with radial discharge combined with a parallel stream and the case of a simple rotary motion about the position of the source within the same boundary, the lines of the latter diagram being taken as lines along which the said dimension is constant in value, these values being fixed at the exit by making the dimension in question at points between adjacent lines of flow at the section proportional to the distances between these lines where they intersect the circle of entry of the water In testimony whereof I affix my signature.

PAUL DÉRIAZ.